United States Patent
Dwivedi

(10) Patent No.: US 6,548,090 B2
(45) Date of Patent: Apr. 15, 2003

(54) EXTRUDABLE CANDY FRUIT FLAVORED FOOD PRODUCT

(75) Inventor: Basant K. Dwivedi, Randolph, NJ (US)

(73) Assignee: Promotion In Motion Companies, Inc., Closter, NJ (US)

( * ) Notice: Subject to any disclaimer, the term of this patent is extended or adjusted under 35 U.S.C. 154(b) by 16 days.

(21) Appl. No.: 09/834,966

(22) Filed: Apr. 13, 2001

(65) Prior Publication Data

US 2002/0192356 A1 Dec. 19, 2002

(51) Int. Cl.⁷ .................. A23G 3/00; A23L 1/0562; A23L 1/0524
(52) U.S. Cl. .................. 426/103; 426/660; 426/576; 426/640; 426/516; 426/517
(58) Field of Search ................... 426/576, 660, 426/640, 516, 517, 103

(56) References Cited

U.S. PATENT DOCUMENTS

| | | | | | |
|---|---|---|---|---|---|
| 4,205,093 A | * | 5/1980 | Blake | .................. | 426/333 |
| 4,300,329 A | * | 11/1981 | Naylor et al. | .................. | 53/506 |
| 4,853,236 A | * | 8/1989 | Langler | .................. | 426/102 |
| 5,002,791 A | * | 3/1991 | Knebl | .................. | 426/660 |
| 5,455,053 A | * | 10/1995 | Zimmerman et al. | ....... | 426/106 |
| 5,516,542 A | * | 5/1996 | Zimmerman et al. | ....... | 426/420 |
| 5,840,354 A | * | 11/1998 | Baumann et al. | .......... | 426/74 |
| 6,183,799 B1 | * | 2/2001 | Wu et al. | .................. | 426/516 |
| 2001/0014362 A1 | * | 8/2001 | Babiarz et al. | ............... | 426/96 |
| 2001/0043981 A1 | * | 11/2001 | Lewis et al. | .................. | 426/96 |

\* cited by examiner

*Primary Examiner*—Nina Bhat
(74) *Attorney, Agent, or Firm*—Knechtel Demeur & Samlan

(57) ABSTRACT

A candy product intended to be extruded in a ribbon/belt format and capable of being extruded and rolled upon itself to create a candy roll product eliminating the need of an underlying support material, and of the type generally including as ingredients, sweetening agents, flavoring agents, binders, water, stabilizers, acidulants, fruit flavorants, and coloring agents, the improvement comprising the addition of between 0.25% and 5% by weight of gelatin thereby to provide an extrudable candy.

9 Claims, No Drawings

EXTRUDABLE CANDY FRUIT FLAVORED FOOD PRODUCT

FIELD OF THE INVENTION

The present invention relates to an extrudable candy flavored food product of the type which is generally extruded in flat sheets or rolls, and intended to be rolled into a fruit roll candy product.

BACKGROUND OF THE INVENTION

Candy products generally vary a great deal depending upon the type of candy product intended to be created and sold to the public. One such type of candy product is generally referred to as a fruit roll, which is generally a soft, lightly chewy ribbon of a fruit-based confection extruded onto glossy paper and rolled. This type of product is generally formulated from a variety of components, including sweetening agents, flavoring agents, binders, water, stabilizers, acidulants, fruit flavorants, and coloring agents. It is well known that the candy industry as well as the snack type food products is a highly competitive industry. Hence, it is particularly desirable to aid in the marketability of any particular candy product by generally being able to increase the novelty as well as the edibility of the product in order to enhance the merchandising of that particular food product.

Fruit based snack products such as fruit rolls, have found a very good market acceptance, and the merchandising of rolled up tape of candied fruit product has been successful heretofore. These types of products generally include the ingredients set forth above, and have in common the fact that they have a very high sweetening agent content, but a fairly low water content. This tends to make the product somewhat tacky and sticky so that it is extruded in order to create a ribbon effect. The drawback has been that the product is fairly sticky, and therefore, in order to extrude the same in the form of a ribbon, and then to create a roll from the product, it is necessary that the product first be extruded onto a glossy paper or other underlying support material. In this manner, once the product is created in the roll form, there is a glossy paper or other support material which separates the candy from itself and incident to the rolling process. This then permits the consumer to unpeel the extruded candy ribbon from the glossy paper in order to consume the same.

Heretofore, it has not been possible to create such a candy product in rolled form without providing a glossy paper or other similar underlying support material which thereby allows the consumer to peel the candy from the paper incident to the consuming process.

PRIOR ART

Various formulations have been employed heretofore in the creation of fruit roll candy products. For example, U.S. Pat. No. 4,117,176 delineates a number of such types of products which are currently commercially available. The subject patent has as its purpose the creation of a similar candy product which is translucent, and includes opaque dehydrated fruit particles therein.

A more explanatory prior art consists of U.S. Pat. No. 6,153,233, which is intended to present an improved method and apparatus for creating a candy fruit flavored rolled ribbon like candy product. The purpose of the subject patent is to produce a method which improves upon the method of creating such a product. However, as delineated in the U.S. Pat. No. 6,153,233, the prior art continues to produce a ribbon type candy product generally referred to as a fruit roll, which requires an underlying support material onto which the candy product is extruded. By extruding the product onto an underlying support material, the product then may be rolled upon itself and when rolled, will keep a layer of the underlying support material such as glossy paper adjacent to the candy so that the consumer may unroll it and be able to consume the candy product. It is clear in the prior art that any attempt to create the rolled candy product without providing a glossy paper support material will cause the candy to stick to itself when rolled, and make it impossible for the consumer to consume the product.

It has therefore been deemed desirable to be able to produce a candy formulation for creating a fruit rolled candy product which eliminates the underlying support material or glossy paper in order to eliminate the problem of the disposal of the paper and also reduce the cost of manufacturing the product. It will be understood that if one can eliminate the support material or the glossy paper, one can eliminate a significant expense incident to the manufacturing process, which reflects itself from the cost of the product.

OBJECTS AND ADVANTAGES

It is therefore the object of the present invention to provide a formulation for a fruit flavored fruit roll candy product which maintains all the desirable characteristics of such types of products including the tackiness thereof, but eliminates the need for an underlying support material for the extrusion of the candy product thereon.

In connection with the foregoing object, it is a further object of the present invention to provide a fruit roll candy product of the type described wherein the underlying support material may be eliminated, while still permitting the product to be rolled onto itself and accommodate the unrolling thereof by the consumer for the purpose of consuming the product.

Further features of the invention will best be understood by reference to the accompany specification which delineate and explain the preferred embodiments of the invention.

SUMMARY OF THE INVENTION

In summary, it is the object of the present invention to provide a fruit roll candy product which may be extruded in the form of a ribbon or belt, which maintains a sticky yet pliable characteristic, and nevertheless enables the product to be rolled onto itself without the need of any underlying support material. Further, the formulation of the present invention is intended to provide a rolled fruit candy product which maintains an excellent eating quality, and yet has extended shelf life, while still maintaining all the other characteristics of such types of candy products without the need of the underlying support material in order to permit the consumer to unroll and consume the product.

BRIEF DESCRIPTION OF INVENTION

The objects and advantages of the present invention as delineated heretofore are achieved when the formulation for the candy product is adjusted by including a gelatin in the formulation at a range of between 0.25 percent and 5 percent by weight. It has further been found that the further inclusion of glycerin in combination with the gelatin produces a product which again, is sufficiently tacky and sticky, but not so tacky and sticky as to not be pliable, in order to permit the product to be rolled onto itself without the need of a glossy paper or other underlying support material and yet permit the unrolling thereof to permit the consumer to unroll the product. It is found that the formulation of the present invention maintains excellent taste characteristics.

DETAILED DESCRIPTION OF THE INVENTION

A typical formulation for creating a candy fruit roll candy product was created in the following manner:

EXAMPLE 1
Prior Art

| INGREDIENT | PERCENTAGE |
| --- | --- |
| Corn syrup | 46.1 |
| Fruit concentrate | 4.5 |
| Strawberry puree | 3 |
| Glycerin | .75 |
| Cornstarch | 17 |
| Wheat starch | 8.5 |
| Sugar | 13.8 |
| Water | 3.1 |
| Hydrogenated vegetable oil | 1.5 |
| Glycerol monostearate | .3 |
| Sodium citrate | .25 |
| Salt | .1 |
| Citric acid | .9 |
| Flavor | .20 |

A uniform slurry of ingredients was made in a kettle provided with a suitable agitator. It was then cooked in a continuous cooker at a temperature of 266° F. (130° C.). The candy mass was transferred from the continuous cooker to a vacuum chamber to reduce the residual moisture and then extruded. The ribbons that were produced were extremely sticky and did not lend themselves to making a roll on a rolling machine. The product had to be discarded.

In altering the formulation, it was found that by adding gelatin, the following occurred:

EXAMPLE 2

| INGREDIENT | PERCENTAGE |
| --- | --- |
| Glucose syrup | 45.4 |
| Fruit concentrate | 4.4 |
| Strawberry puree | 3 |
| Glycerin | .7 |
| Corn starch | 16.7 |
| Wheat starch | 8.4 |
| Sugar | 13.6 |
| Water | 3 |
| Gelatin | 1.50 |
| Hydrogenated vegetable oil | 1.5 |
| Glycerol monostearate | .3 |
| Sodium citrate | .25 |
| Salt | .1 |
| Citric acid | .9 |
| Flavor | .15 |

As provided in Example one, a slurry consisting of the above formulation was prepared and processed. The resulting ribbons that were extruded from the cooked candy mass were not as sticky but were pliable and able to produce the roll from ribbons with ease. The product had excellent taste characteristics and held up very well for several months when packaged in a metalized foil film at room temperature. It was found that the rolls that were created from the product could be rolled without the presence of an intermediate or underlying support material such as glossy paper, and yet were able to be unrolled and consumed.

It will be noted that the inclusion of gelatin and a range of about 1.5 percent by weight of the product, resulted in a product which could be rolled without the need of the underlying support material.

A slightly altered formulation was created in order to determine whether the gelatin could be present in a slightly reduced percentage and still produce a desirable product. The following slurry was created:

EXAMPLE 3

| INGREDIENT | PERCENTAGE |
| --- | --- |
| Invert sugar | 7.3 |
| Corn syrup | 37.8 |
| Fruit concentrate | 4.4 |
| Strawberry puree | 2.9 |
| Cornstarch | 16.8 |
| Wheat starch | 8.8 |
| Sugar | 13.4 |
| Water | 3.2 |
| Gelatin | 1.3 |
| Hydrogenated vegetable oil | 1.5 |
| Glycerol monostearate | .7 |
| Sodium citrate | .2 |
| Salt | .1 |
| Citric acid | 1.2 |
| Flavor | .4 |

As provided in example one, a slurry of the above formulation was prepared, cooked and extruded in ribbon form. It will be noted that the gelatin was slightly reduced to a level of 1.3 percent by weight of the formulation, and in addition, invert sugar and corn syrup in combination were substituted for glucose syrup. The ribbon that was produced was not as sticky or tacky, and was yet pliable, and was successful in producing a fruit roll candy product rolled upon itself. The product had excellent eating quality. It was found, however, that upon prolonged storage, the product had a tendency to become tougher and lose some of its soft fruity texture, thereby affecting its shelf life.

A further formulation was created and produced in accordance with the following:

EXAMPLE 4

| INGREDIENT | PERCENTAGE |
| --- | --- |
| Invert sugar | 7.3 |
| Corn syrup | 37.8 |
| Fruit concentrate | 4.4 |
| Strawberry puree | 2.9 |
| Cornstarch | 16.8 |
| Wheat starch | 8.8 |
| Sugar | 13.4 |
| Water | 2.5 |
| Gelatin | .7 |
| Hydrogenated vegetable oil | 1.5 |
| Glycerol monostearate | .7 |
| Sodium citrate | .2 |
| Salt | .1 |
| Citric acid | 1.2 |
| Flavor | .4 |

A slurry of the above formulation was prepared, cooked and extruded in ribbon form. The formulation above was the same as that given in Example 3, with the exception that 0.7 percent by weight of glycerin was added to the formulation at the expense of water. Surprisingly, the glycerin did not make the product as sticky, and at the same time, it provided the moistness in the product necessary for prolonged storage. The product was successfully created in a ribbon format and rolled upon itself successfully without the interposition of support material such as glossy paper.

In accordance with the above examples, it has therefore been determined quite surprisingly that the inclusion of gelatin in the formulation in a range of between 0.25 percent and 5 percent will permit the product to be produced, and extruded in a ribbon format or a belt format, and rolled on itself without the need of glossy paper. The resulting product may be easily unrolled by the consumer, incident to the consumption process.

It has further been determined in accordance with the above examples, that glycerin in the range of 0.2 percent to 6 percent as part of the formulation will produce a fruit roll product with good eating quality and excellent stability. Furthermore, the inclusion of glycerin in combination with gelatin, ultimately produces the candy fruit roll product which may be extruded in the form of a ribbon or belt, which may be rolled upon itself, without the need of extruding the same onto an underlying support material or glossy paper while yet providing a candy product which may be unrolled and consumed by the user thereby maintaining its desirable commercial acceptability.

It was further deemed desirable to continue to vary the formulation with a view toward creating a product formulation which would have an extended shelf life. It was now surprisingly found that in addition to the application of gelatin and glycerin, that if one employs a waxy maize starch in lieu of, or in combination with cornstarch, the product has excellent product stability for a period of several months when packaged in a metalized foil film at room temperature. The following example is illustrative of such a formulation:

EXAMPLE 5

| INGREDIENTS | PERCENTAGE |
| --- | --- |
| Glucose syrup | 45.4 |
| Fruit concentrate | 4.4 |
| Strawberry puree | 3 |
| Glycerin | .7 |
| Waxy maize starch | 16.7 |
| Wheat starch | 8.4 |
| Sugar | 13.6 |
| Water | 3 |
| Gelatin | 1.50 |
| Hydrogenated vegetable oil | 1.5 |
| Glycerol monostearate | .3 |
| Sodium citrate | .25 |
| Salt | .1 |
| Citric acid | .9 |
| Flavor | .15 |

As provided in Example Two, a slurry consisting of the above formulation was prepared, cooked and processed. It will be noted that waxy maize starch was substituted for the cornstarch as the primary binder. Ribbons that were extruded from the cooked candy mass were not as sticky or tacky, but were pliable and were able to produce a roll from the ribbons with ease. The rolls were rolled upon themselves without the need of any underlying support material or glossy paper. The product had excellent taste characteristics and held up very well for several months when packaged in a metalized foil film at room temperature.

It has also been found that the waxy maize starch may be used in combination with cornstarch and that the same beneficial qualities of the resulting product can be obtained even when the waxy maize starch is reduced down to a level of 4%. The following example provides an illustration of a formulation using a combination of waxy maize starch and cornstarch.

EXAMPLE 6

| INGREDIENTS | PERCENTAGE |
| --- | --- |
| Glucose syrup | 45.4 |
| Fruit concentrate | 4.4 |
| Strawberry puree | 3 |
| Glycerin | .7 |
| Waxy maize starch | 4 |
| Cornstarch | 12.7 |
| Wheat starch | 8.4 |
| Sugar | 13.6 |
| Water | 3 |
| Gelatin | 1.50 |
| Hydrogenated vegetable oil | 1.5 |
| Glycerol monostearate | .3 |
| Sodium citrate | .25 |
| Salt | .1 |
| Citric acid | .9 |
| Flavor | .15 |

A slurry consisting of the above formulation was prepared, cooked and processed. The waxy maize starch was used in combination with corn starch as the primary binder. Ribbons were extruded from the cooked candy mass and were found to be not as sticky or tacky, but were pliable and were able to produce a roll from the ribbons with ease. The rolls were rolled upon themselves without the need of an underlying support material or glossy paper. The product had excellent taste characteristics and held up very well, once again, for several months when packaged in a metalized foil film at room temperature.

It has been determined that most starches including cornstarch, are created from amylose, which is basically a straight chain of carbohydrate. The waxy maize starch, is devoid of amylose, and it is really amylopectin. This is a branch chain carbohydrate, and apparently, has an impact on the formulation in terms of product stability when substituted for cornstarch.

Therefore, it will be appreciated from the above examples, that the present invention has found that surprisingly, when one includes both gelatin and glycerin in the product formulation, even though the product maintains a relatively high ratio of sweetening agents to water, the tackiness and/or stickiness of the product is diminished somewhat in order to permit the product to be extruded in a ribbon or belt format, and rolled upon itself without the need of the underlying support material or glossy paper. In this manner, one has been able to reduce the cost of preparing such a candy product, while yet not diminishing the product acceptability or desirable characteristics that the public has come to expect from such a candy product.

It has further been found that by substituting a waxy maize starch for cornstarch, the product shelf life and stability has been enhanced for several months without effecting the taste characteristics of the product, or the ability of the product to be rolled without an underlying glossy paper or support material. Hence, the adjustments to the formulation as described herein, have achieved the objects and advantages as set forth hereinabove.

What is claimed is:

1. A fruit candy ribbon/belt roll product capable of being extruded and rolled upon itself without an underlying support material comprising the following formulation in the approximate following percentages by weight:

Sweetening agent—45.4%
Fruit concentrate—4.4%
Fruit puree—3%
Starch—25.1%
Sugar—13.6%
Water—3%
Gelatin—1.5%
Hydrogenated vegetable oil—1.5%
Stabilizer—0.3%
Sodium citrate—0.25%
Salt—0.17%
Acidulant—0.9%
Flavoring agent—0.15%.

2. A fruit candy product in accordance with claim 1 above, wherein the formulation further includes between 0.2% and 6% by weight of glycerin.

3. The candy product as set forth in claim 1 above, wherein the starch component is partially replaced with at least about 4% by weight of waxy maize starch.

4. A fruit candy ribbon/belt roll product capable of being extruded and rolled upon itself without an underlying support material comprising the following formulation in the approximate following percentages by weight:

Sweetening agents—45.4%
Fruit concentrates—4.4%
Fruit puree—3%
Glycerin—0.2%–6%
Waxy maize starch—4%
Cornstarch—12.7%
Wheat starch—8.4%
Sugar—13.6%
Water—3%
Gelatin—1.5%
Hydrogenated vegetable oil—1.5%
Stabilizer—0.3%
Sodium citrate—0.25%
Salt—0.1%
Acidulant—0.9%
Flavoring agent—0.15%.

5. A fruit candy ribbon/belt roll product capable of being extruded and rolled upon itself without an underlying support material comprising the following formulation in the approximate following percentages by weight:

Sweetening agents—45.4%
Fruit concentrates—4.4%
Fruit puree—3%
Glycerin—0.2%–6%
Waxy maize starch—16.7%
Wheat starch—8.4%
Sugar—13.6%
Water—3%
Gelatin—1.5%
Hydrogenated vegetable oil—1.5%
Stabilizer—0.3%
Sodium citrate—0.25%
Salt—0.1%
Acidulant—0.9%
Flavoring agent—0.15%.

6. A candy product intended to be extruded in a ribbon/belt format and capable of being extruded and rolled by upon itself to create a candy roll product eliminating the need of underlying support material, including as ingredients sweetening agents, flavoring agents, binders, water, stabilizers, acidulants, fruit flavorants, and coloring agents, the improvement comprising the addition of between 0.25% and 5% by weight of gelatin, 0.2% to 6% by weight of glycerin, while at the same time maintaining the fruit flavorants and fruit puree's at a level not exceeding 10% thereby to provide an extrudable candy product capable of being rolled on itself and unrolled for consumption.

7. A candy product intended to be extruded in a ribbon/belt format and capable of being extruded and rolled upon itself to create a candy roll product eliminating the need of an underlying support support material, including as ingredients, sweetening agent flavoring agents, binders, water, stabilizers, acidulants, fruit flavorants, and coloring agents, the improvement comprising the addition of between 0.25% and 5% by weight of gelatin while maintaining the fruit flavorants and fruit puree's at a level not exceeding 10% by weight thereby to provide an extrudable candy product capable of being rolled on itself and unrolled for consumption.

8. A candy product intended to be extruded in a ribbon/belt format and capable of being extruded in a roll upon itself to create a candy roll product eliminating the need of an underlying support material, including as ingredients, sweetening agents, flavoring agents, the improvement comprising the addition of between 0.25% and 5% by weight of gelatin, 0.2% to 6% by weight of glycerin, and including as a component of the starch competent at least 4% by weight of waxy maize starch, thereby to provide an extrudable candy product capable of being rolled on itself and unrolled for consumption.

9. A candy product intended to be extruded in a ribbon/belt format and capable of being extruded in a roll upon itself to create a candy roll product eliminating the need of an underlying support material, including as ingredients, sweetening agents, flavoring agents, the improvement comprising the addition of between 0.25% and 5% by weight of gelatin, 0.2% to 6% by weight of glycerin, and including as a component of the starch competent at least 4% by weight of waxy maize starch, while at the same time maintaining the fruit flavorants and fruit puree's at a level not exceeding 10% thereby to provide an extrudable candy product capable of being rolled on itself and unrolled for consumption.

* * * * *